(12) United States Patent  
Kusmich

(10) Patent No.: US 8,826,586 B1  
(45) Date of Patent: Sep. 9, 2014

(54) FISHING RIG

(76) Inventor: Christos Reginald Kusmich, Deerfield Beach, FL (US)

( * ) Notice: Subject to any disclaimer, the term of this patent is extended or adjusted under 35 U.S.C. 154(b) by 322 days.

(21) Appl. No.: 13/312,557

(22) Filed: Dec. 6, 2011

Related U.S. Application Data

(63) Continuation-in-part of application No. 12/314,529, filed on Dec. 11, 2008, now abandoned.

(51) Int. Cl.
*A01K 83/06* (2006.01)

(52) U.S. Cl.
USPC .............................. 43/44.2; 43/44.83; 43/44.4

(58) Field of Classification Search
USPC ............................... 43/44.2, 44.83, 44.4, 44.8
See application file for complete search history.

(56) References Cited

U.S. PATENT DOCUMENTS

| | | | |
|---|---|---|---|
| 797,161 A | 8/1905 | West | |
| 2,196,376 A | 4/1940 | Anderson | |
| 2,553,895 A | 5/1951 | Carter | |
| 2,562,605 A | 7/1951 | Embree et al. | |
| 2,700,242 A | 1/1955 | Porth | |
| 2,880,545 A | 4/1959 | Stadler | |
| 3,293,791 A | 12/1966 | Hinkson | |
| 4,067,135 A | 1/1978 | Martin | |
| 4,129,957 A | 12/1978 | Thirlby | |
| 5,117,575 A | 6/1992 | Desmond | |
| 5,218,780 A | 6/1993 | Jacobson | |
| 5,778,593 A | 7/1998 | Baron | |
| 5,881,490 A | 3/1999 | Richardson | |
| 6,327,808 B1 | 12/2001 | Zascavage | |
| 6,675,526 B1 | 1/2004 | Baron | |
| 6,698,133 B1 | 3/2004 | Fricke | |

*Primary Examiner* — Christopher P Ellis
(74) *Attorney, Agent, or Firm* — Christopher & Weisberg, P.A.

(57) ABSTRACT

An apparatus and method of attaching bait to a fishing rig for trolling. The apparatus may generally include a line defining an attachment means that is configured to lie substantially flush to a bait, and a bait attachment line for affixing the fishing rig to a bait. The apparatus may further include one or more hooks. The apparatus may optionally include weights or one or more extension rigs. The method may include inserting the bait attachment line through a first end of a bait and through the attachment means, then securing the bait attachment line by wrapping it around the first end of the bait. The one or more hooks may be positioned along the length of the bait.

12 Claims, 5 Drawing Sheets

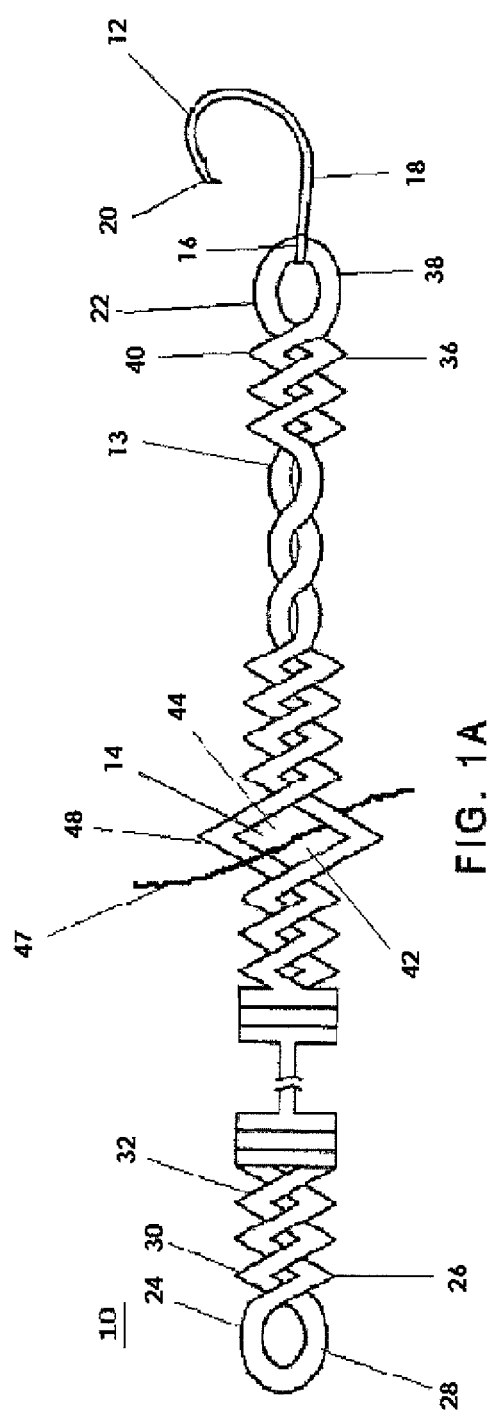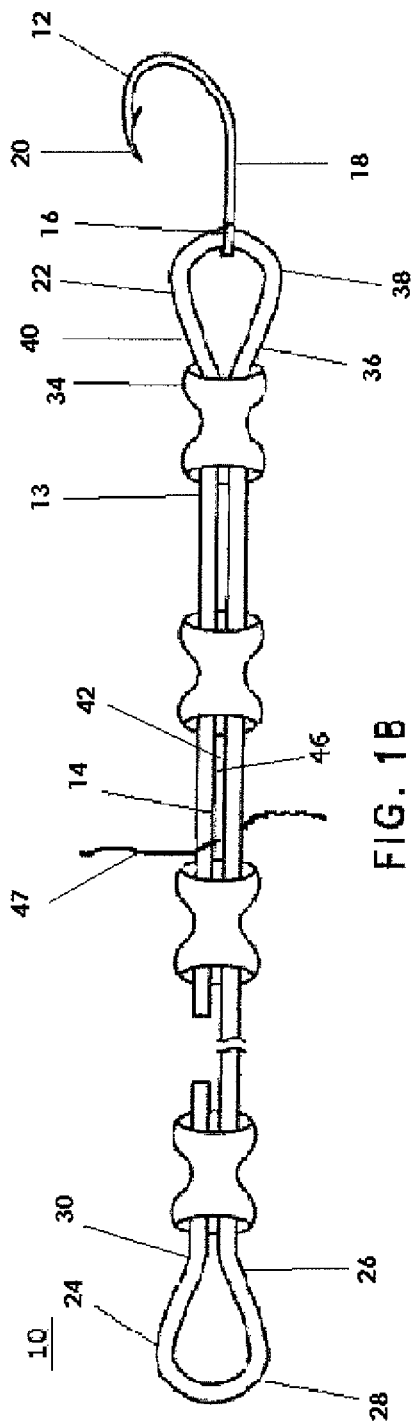

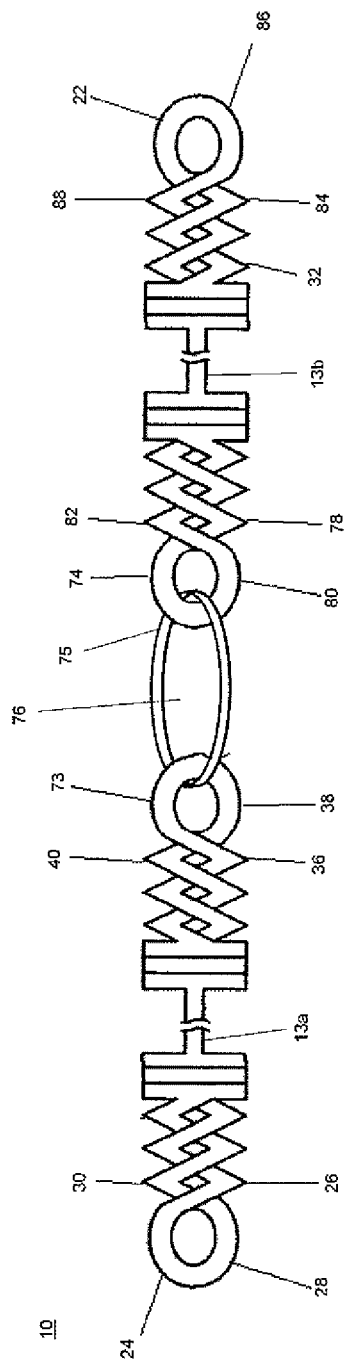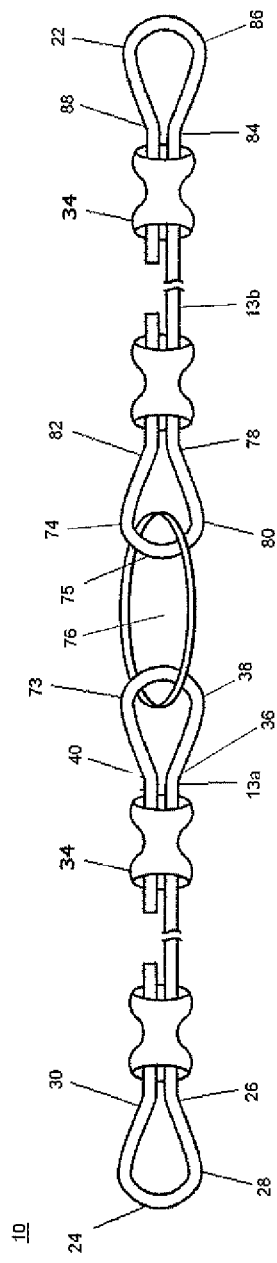
FIG. 3A
FIG. 3B

FISHING RIG

CROSS-REFERENCE TO RELATED APPLICATION

This application is a continuation-in-part-of patent application Ser. No. 12/314,529, filed Dec. 11, 2008, entitled FISHING RIG, the entirety of which is incorporated herein by reference.

STATEMENT REGARDING FEDERALLY SPONSORED RESEARCH OR DEVELOPMENT n/a

FIELD OF THE INVENTION

The present invention relates to a method and system for attaching bait to a fishing line for trolling.

BACKGROUND OF THE INVENTION

The present invention is directed toward a fishing rig and more particularly, a fishing rig generally used for catching big game fish by the method of trolling. Trolling is a method of fishing in which one or more baited fishing lines are pulled through the water pulling bait through the water behind a boat. The bait may be a lure (artificial bait), live bait, dead bait, or any combination thereof. Trolling is commonly used to catch pelagic fish species such as dolphin and mackerel, and is also frequently used to catch saltwater game fish such as marlin, tuna, kingfish, and bluefish, among others.

Despite the general success rate of this fishing method, there are some problems commonly associated with trolling. One such problem is the accumulation of debris on the trolling rig, whether using artificial, live, or dead bait. Because of the attachment designs of known fishing rigs, the hooks and other elements of the trolling rig may protrude from the body of the bait, and it is common that debris such as sea grass, seaweed, and trash may become entangled with the rig. Not only can this debris add weight to the rig and stress to the trolling line, but it can also obscure the bait, hooks, and hook barbs, which may result in a lower catch rate. One commonly used example of such an attachment design is the pin rig. The pin rig includes threading a wire ("pin") that is attached to a fishing line through the mouth of dead bait. After inserting the pin, the head of the bait is then wrapped with wire both in front of and behind the pin, the pin becoming the point of attachment between the bait and the fishing line. The pin is not "worked in" to the bait, and instead protrudes from the bait. As a result, significant amounts of debris may become attached to the protruding pin as the bait moves through the water.

A further problem associated with trolling is that the trolling method may be hard on the bait attached to the rig, particularly if live or dead bait is used. The constant force of oncoming water as the rig is pulled behind the boat can create a stress point between the rig and the bait. Many of the trolling rigs commonly used do not provide for a method of reinforcement at this point of attachment and, as a result, bait can be ripped from the rig. Not only is the loss of bait economically inefficient, but it may also result in a significantly lower catch rate. Additionally, many common rigs require the use of specialized tools, which may be costly and cumbersome to use.

Finally, trolling requires the fisherman or angler to take several important conditions into consideration. For example, the correct positioning of the hook(s) within the bait is essential to achieve a high or successful catch rate. Specifically, the hooks should be distributed along the length of the bait, and not located only at the point of attachment between the bait and the rig, as is common in the industry. A multiple-hook arrangement may increase the chance that a target species fish find the hook when feeding on the bait. The swimming action of the bait is also important. Bait that "swims" (moves by water currents when pulled through the water) naturally will give the illusion of being a living fish, and will attract more target species. The depth of the water at which bait is trolled is also important, because different species of fish prefer different water depths. Therefore, a rig must be adapted to remain at a desired depth, such as by the addition of weights to the rig or bait.

Therefore, it would be desirable to provide an improved trolling rig that results in a high catch rate by avoiding the accumulation of debris as the rig is pulled through the water, by providing a reinforced point of attachment between the rig and the bait, by having an optimal distribution of hooks throughout the bait, by having a natural swim action, by being adapted to maintain at a certain water depth while being pulled through the water, and by reducing the cost and inconvenience of using additional tools.

SUMMARY OF THE INVENTION

The present invention advantageously provides an apparatus and method of attaching bait to a fishing rig. Such fishing apparatus and method may be used in trolling. The fishing apparatus may include a rig line, a bait attachment line having a diameter, and a bait attachment element defined by the rig line and having an aperture sized to accommodate the diameter of the bait attachment line. The rig line and the bait attachment element may be substantially collinear and the bait attachment line may be connectable to the bait attachment element. The bait attachment line may be between approximately 3 and approximately 15 inches in length, and may be composed of copper. The rig line may be composed of metal wire, monofilament, or braided line, and the bait attachment element may have a diamond or box (rectangular or square) shape. Further, the fishing apparatus may include a first end, a second end, the second end defining a main loop, and a hook attached to the main loop.

The fishing apparatus may further include an extension rig line defining an extension rig having a first extension rig loop and a second extension rig loop, and a hook, wherein the first extension rig loop is attached to the main loop and the second extension rig loop is attached to the hook.

Alternatively, the fishing apparatus may include a first rig line and a second rig line, a bait attachment line having a diameter, and a bait attachment element connected to the first rig line and the second rig line, the bait attachment element having an aperture sized to accommodate the diameter of the bait attachment line. The first rig line, the second rig line, and the bait attachment element may be substantially collinear, and the bait attachment line may be connectable to the bait attachment element. Further, the aperture may be approximately 0.10 inch to approximately 0.50 inch in diameter. Further, the bait attachment element may be a ring composed of a continuous piece of material, or a swivel. Further, the extension device line may be composed of metal wire, monofilament, or braided line. Further, the fishing apparatus may include an extension rig line defining an extension rig having a first extension rig loop and a second extension rig loop, and a hook, the first extension rig loop being attached to the main loop and the second extension rig loop being attached to the hook.

The method may include providing a substantially collinear fishing apparatus including a line, a bait attachment device having an aperture and being substantially collinear with the fishing apparatus, and a length of malleable wire having a first end and second end and sized to be passed through the bait attachment device and circumscribe the bait at least once; providing a live or dead bait having a first end, a second end, a dorsal portion, a ventral portion, a first side, and a second side; positioning the fishing apparatus on the dorsal portion of the bait proximal to the first end of the bait, the bait attachment device in contact with the dorsal portion of the bait; passing the length of malleable wire through the first end of the bait and through the aperture of the bait attachment device; circumscribing at least once with the malleable wire the first end of the bait and at least a portion of a line of the fishing apparatus; and positioning the first end and second end of the length of malleable wire such that the ends do not protrude from the bait or fishing apparatus.

The fishing apparatus of the method may further include at least one hook and the method may further include positioning the at least one hook along the length of the bait. The bait attachment device may be defined by the line and has either a diamond or box shape. Alternatively, the bait attachment device may be a ring composed of a continuous piece of material, or a swivel.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1A shows a first embodiment of an assembled fishing rig;

FIG. 1B shows a second embodiment of an assembled fishing rig;

FIG. 3A shows a third embodiment of an assembled fishing rig;

FIG. 3B shows a fourth embodiment of an assembled fishing rig;

DETAILED DESCRIPTION OF THE INVENTION

Figure 2A:
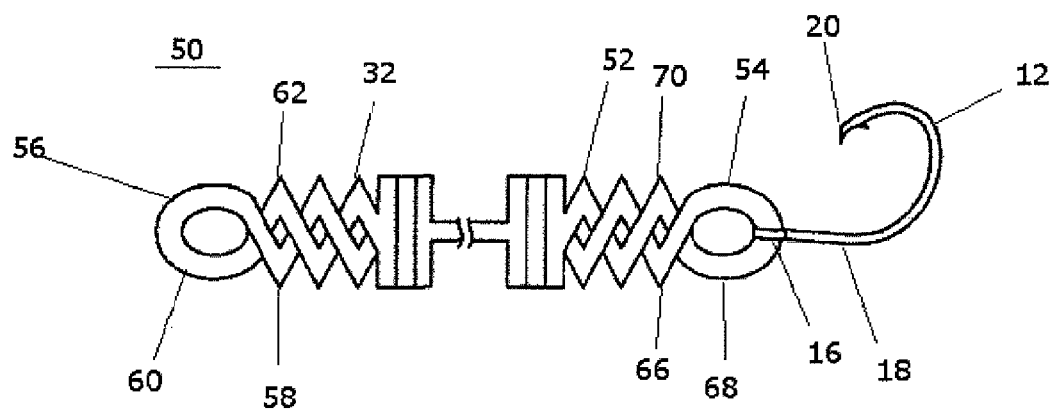
FIG. 2A shows a first embodiment of an assembled extension rig.

The present invention provides an improved apparatus and method of attaching bait to a fishing rig. Such apparatus and method may be used in trolling. The apparatus described herein (referred to generally as "rig") may be substantially collinear and may generally include one or more lines and one or more hooks to which bait (artificial, live, dead, or other) may be attached. The one or more lines may consist of wire, monofilament, or braided line, and the one or more hooks may be any appropriate style of hook used in the fishing industry. For example, a circle-type hook may be used when using a catch-and-release method or when desirable to avoid damage to the target species. Further, the rig may include a single hook or multiple hooks, such as when a single-hook rig and one or more extension rigs are combined. Further, no hooks may be included. For example, a device such as a hook connector may be included instead, to which a preferred hook may be added at a later time. Further, the rig may include a length of copper or other malleable wire for further securing the rig to bait. Further, the rig may have attached thereto a weight or the rig may be unweighted.

As used herein, the term "rig" refers to any apparatus generally attached to the end of a fishing line used to catch fish. A rig may include a hook, bait, and one or more lines.

As used herein, the term "extension rig" refers to any apparatus generally attached to a rig that extends the length of the rig and/or adds additional hooks, or artificial enhancers.

As used herein, the term "fishing line" refers to any one or more lines (composed of monofilament, wire, or other material) used to connect the rig and/or rig extension to a fishing (for example, trolling) boat. As used herein, the term "line" refers to a length of monofilament, wire, or other material included in the rig. The line may function as a point of attachment between the rig and the fishing line. Further, as used herein, the term "bait attachment line" refers to an independent length of wire (such as copper wire), monofilament, or other material used to affix the rig to bait.

Referring now to FIGS. 1A and 1B, a first and second embodiment of an assembled fishing rig is shown. The fishing rig 10 may be composed of a line 13, which may generally define or include a bait attachment means 14 that provides a point for securing the fishing rig 10 to a bait, and a bait attachment line 47 for securing the fishing rig 10 to a bait, using the bait attachment means 14. The fishing rig 10 may also include a hook 12 for catching a target species (and so the fishing rig 10 may be referred to as a "fishing rig 10"). The hook 12 may be any style of hook known in the fishing industry. The hook 12 may include an eye 16, a shank 18, and one or more barbs 20. The size of the hook 12 and/or number of barbs 20 used may depend on the target species of fish.

Continuing to refer to FIGS. 1A and 1B, the fishing rig 10 may include a hook end 22 to which the hook 12 may be attached, and a fishing line end 24 to which a fishing line (not shown) may be attached. The line 13 may be composed of any material suitable for use in the fishing industry, but wire (such as titanium or nickel-copper alloy) is shown in FIG. 1A and monofilament or braided line is shown in FIG. 1B. At the fishing line end 24 of the fishing rig 10, the line 13 may include a first leader portion 26, a first loop portion 28, and a first tag end portion 30. If wire is used (as in FIG. 1A), the first tag end portion 30 may be secured to the first leader portion 26 by one or more haywire twists, barrel locks, or other appropriate twists or knots 32. The more haywire twists, barrel locks, etc. 32 that are used, the stronger the secured area may be. If monofilament is used (as in FIG. 1B), the first tag end portion 30 may be secured to the first leader portion 26 by one or more crimping sleeves 34 or similar clamping devices, or other appropriate knots.

At the hook end 22 of the fishing rig 10, the line 13 may further include a second leader portion 36, a second loop portion 38, and a second tag end portion 40. The second tag end portion 40 may be secured to the second leader portion 36, forming the second loop portion 38. The second loop portion 38 may be formed including a hook 12 (such as by passing the second leader portion 36 through an eye 16 of a hook 12) or without a hook 12. If the second loop portion 38 is formed without a hook 12, a hook 12 may later be secured to the fishing rig 10 by passing the second loop portion 38 through the eye 16 and over the shank 18 of the hook 12. If wire is used as the line 13 (as in FIG. 1A), the second tag end portion 40 may be secured to the second leader portion 36 by one or more haywire twists, barrel locks, or other appropriate twists or knots 32, the second tag end portion 40 and second leader portion 36 being long enough to define the bait attachment means 14. If monofilament is used as the line 13 (as in FIG. 1B), the second tag end portion 40 may be secured to the second leader portion 36 by one or more crimping sleeves 34 or similar clamping devices, the second tag end portion 40 and second leader portion 36 being long enough to define the bait attachment means 14. The size of the one or more crimping sleeves 34 may depend on the diameter and gauge of the line 13.

The size of the first and second loop portions 28, 38 and the lengths of the areas over which the first and second tag end portions 30, 40 may be secured to the first leader portions 26, 36 may depend on such factors as the gauge, diameter, and material of the fishing line, the type of bait used, and the target species. The length of the area over which the second tag end portion 40 may be secured to the first second leader portion 36 may also be determined by the desired distance between the bait attachment means 14 and the hook end 22 of the fishing rig 10, which may have one or more hooks 12 attached thereto. For example, bait such as an eel may require a greater distance between the bait attachment means 14 and hook end 22 than would a bait such as a minnow.

The line 13 of the fishing rig 10 may define an attachment means 14 for attaching bait to the fishing rig 10. The attachment means 14 may provide a mechanism for attaching bait to the fishing rig 10 in which the point of attachment does not protrude from the bait (such as in a pin rig), but instead lies flat against the bait and does not collect debris as the bait moves through the water. Further, using the attachment means 14 instead of a hook 12 as the point of attachment between the fishing rig 10 and bait allows the one or more hooks 12 to be distributed at desired distances along a portion or substantially all of the length of a bait, which may increase the chances of catching a target species. Within the area over which the second tag end portion 40 is secured to the second leader portion 36, the line 13 may define an attachment means 14 having an aperture 42, such as a diamond 44 shape as shown in FIG. 1A or the box 46 shape as shown in FIG. 1B. A bait attachment line 47 may be passed through the aperture 42 of the attachment means 14 and wrapped around the bait to affix the fishing rig 10 to the bait (as shown and described in FIGS. 4-5B). The bait attachment line 47 may be composed of malleable wire (such as copper), monofilament, or any other suitable material, and may be long enough to wrap around the bait at least once (for example, the bait attachment line 47 may be between approximately 3 and approximately 36 inches in length). The material of the bait attachment line 47 may be selected based on the size of the bait, target species, type of attachment means 14 used, and other considerations. An attachment means 14 that is defined by the line 13 may be as strong as the line 13 itself. For example, the attachment means 14 may be able to withstand at least 100 pounds of pressure if a 100-lb test line 13 is used.

It should be noted that each of the internal angles of the diamond 44 may be greater than or less than 90 degrees. Likewise, each of the internal angles of the box 46 may be greater than or less than 90 degrees. If wire is used for the line 13, the diamond shape 44 may be created by creating a bend 48 in each of the second leader portion 36 and the second tag end portion 40 (if wire is used for the line 13) between haywire twists, barrel locks, or the like 32. That is, the second leader portion 36 and second tag end portion 40 may be directed apart, a bend 48 created in each, and then directed back toward each other to continue the haywire twists, barrel locks, or the like 32. Because malleable wire may be used for the line 13, no additional tools are required. If monofilament is used for the line 13, the box 46 may be created, for example, by positioning two crimping sleeves 34 at a desired distance apart. Using the line 13 to define the bait attachment means 14 may increase the strength of the fishing rig 10. The attachment means 14 may be larger or smaller than depicted in the figures, as long as the aperture 42 of the attachment means is sized to accommodate the diameter of a copper or other malleable wire, as discussed in the method described herein. For example, the diameter of the aperture may be between approximately 0.10 and approximately 1.00 inch.

The overall length of the fishing rig 10, which may function to separate the bait from the fishing line, may depend on the type of bait used, the target species, and other factors. For example, if using ballyhoo as bait, the length of the fishing rig 10 may be between ten and fifteen feet.

Figure 2B:
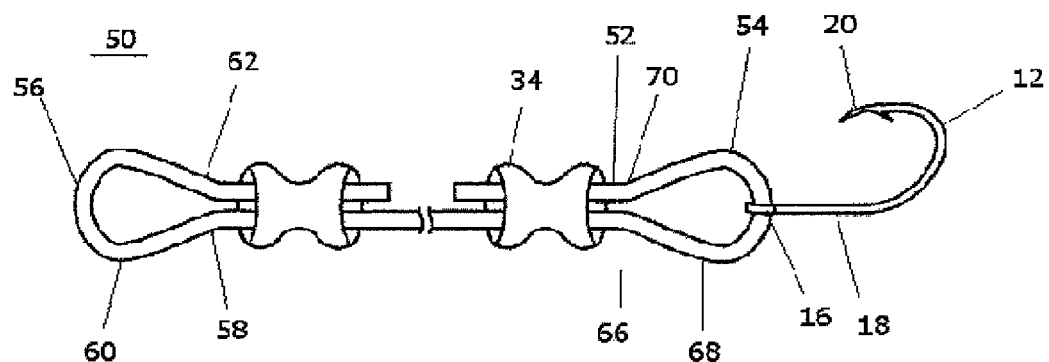
FIG. 2B shows a second embodiment of an assembled extension rig.

Referring now to FIGS. 2A and 2B, a first and second embodiment of an assembled extension rig 50 including wire or monofilament are shown. The extension rig 50 may generally include a hook 12 for catching a target species, and a line 52 for attaching the hook 12 to a fishing rig 10 or other extension rig 50. The hook 12 and is as shown and described in FIGS. 1A and 1B, and the line 52 is as shown and described in FIGS. 1A and 1B as "line 13."

Continuing to refer to FIGS. 2A and 2B, the extension rig 50 may include a hook end 54 to which the hook 12 may be attached, and a fishing rig end 56 to which a fishing rig 10 may be attached. At the fishing rig end 56 of the wire extension rig 50, the line 52 may include a first leader portion 58, a first loop portion 60 which may pass through the second loop portion 38 of the fishing rig 10 (such as when connecting an extension rig 50 to a fishing rig 10), and a first tag end portion 62. If wire is used as the line 52 (as in FIG. 2A), the first tag end portion 62 may be secured to the first leader portion 58 by one or more haywire twists, barrel locks, or other appropriate twists or knots 32. If monofilament is used as the line 52 (as in FIG. 2B), the first tag end portion 62 may be secured to the first leader portion 58 by one or more crimping sleeves 34 or similar clamping devices.

At the hook end 54 of the extension rig 50, the line 52 may further include a second leader portion 66, a second loop portion 68, and a second tag end portion 70. The second tag end portion 70 may be secured to the second leader portion 66, forming the second loop portion 68. The second loop portion 68 may be formed including a hook 12 (such as by passing the second leader portion 36 through an eye 16 of a hook 12) or without a hook 12. If the second loop portion 68 is formed without a hook 12, a hook 12 may later be secured to the fishing rig 10 by passing the second loop portion 68 through the eye 16 and over the shank 18 of the hook 12. If wire is used as the line 52 (as in FIG. 2A), the second tag end portion 70 may be secured to the second leader portion 66 by one or more haywire twists, barrel locks, or other appropriate twists or knots 32. If monofilament is used as the line 52 (as in FIG. 2B), the second tag end portion 70 may be secured to the second leader portion 66 by one or more crimping sleeves 34 or similar clamping devices. The size of the one or more crimping sleeves 34 may depend on the diameter and gauge of the line 52. The size of the first and second loop portions 60, 68 and the lengths of the areas over which the first and second tag end portions 62, 70 may be secured to the first leader portions 58, 66 may depend on such factors as the gauge, diameter, and material of the fishing line, the type of bait used, and the target species. The length of the area over which the second tag end portion 70 may be secured to the first second leader portion 66 may also be determined by the desired distance between a hook 12 or the bait attachment means 14 of the fishing rig 10 and the hook end 54 of the extension rig 50, which may have one or more hooks 12 attached thereto.

Thus, the hooks 12 may be positioned at any location on or within the bait and at any distance from the bait attachment means 14.

The overall length of the extension rig 50, which may function to separate a hook 12 of the extension rig 50 and a hook of the fishing rig 10, may depend on the desired distance between a hook 12 or the bait attachment means 13 of the fishing rig 10 and a hook 12 of the extension rig 50. The desired distance may depend on the type of bait used, the target species, and other factors. One or more extension rigs 50 may be chained together to create a rig with multiple hooks. For example, two extension rigs 50 may be chained in series. A series of extension rigs 50 may include a fishing rig 10 that may have attached thereto a first extension rig 50, which may in turn have attached thereto a second extension rig 50. To attach an extension rig 50 to a fishing rig 10, the first leader portion 58 of the extension rig 50 may be passed through the second loop portion 38 of the fishing rig 10 (to form a first loop portion 60 of the extension rig 50), after which point the first leader portion 58 is considered the first tag end portion 62. The first tag end portion 62 is then secured to the first leader portion 58 of the extension rig 50. To attach one extension rig 50 to another, the first leader portion 58 of one extension rig 50 may be likewise passed through the second loop portion 68 of another extension rig 50 and secured to the first leader portion 58.

Figure 5A:
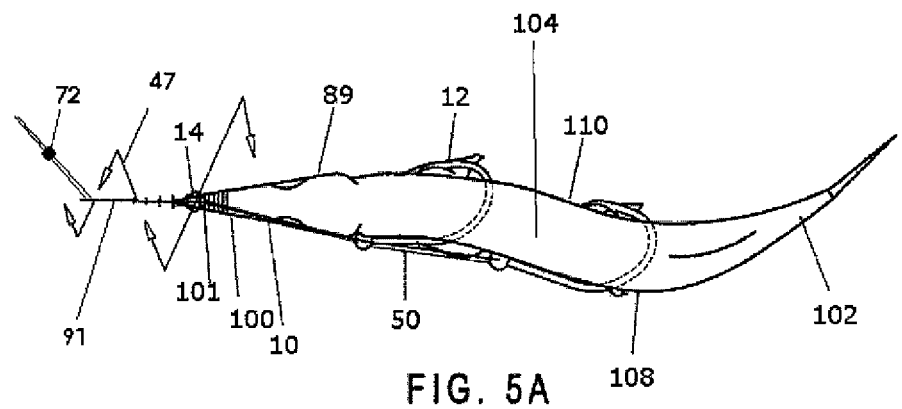
FIGS. 5A and 5B show an embodiment of a method of attaching an assembled fishing rig to bait.
Figure 5B:
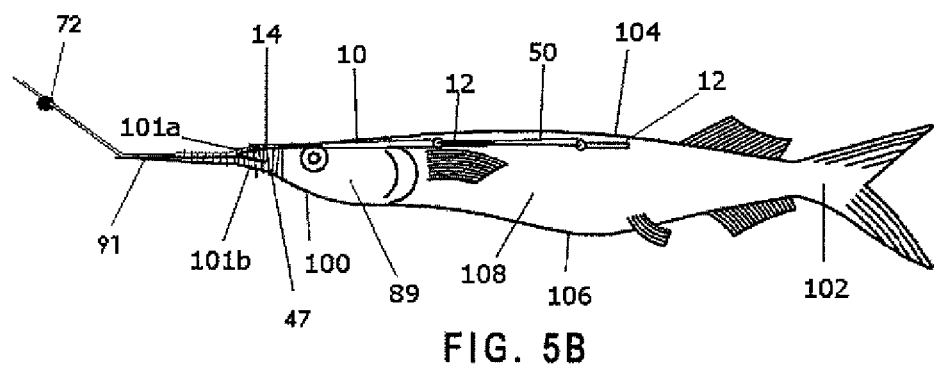

Referring now to FIGS. 1A, 1B, 2A, and 2B, the fishing rig 10 and/or one or more extension rigs 50 may further include one or more weights 72 to control the depth at which the rig is trolled (as shown in FIGS. 5A and 5B). The one or more weight(s) 72 may have a total weight that will cause bait to "swim" through the water at a depth preferred by the target species. The one or more weights 72 may be of any composition or style known in the industry, and may be clamped, threaded, or attached at any location in front of (that is, toward the first end 24 of the fishing rig 10, or beyond the first end 24 of the fishing rig 10, such as along a fishing line attached to the fishing rig 10). For example, FIGS. 5A and 5B show a weight 72 attached to or threaded onto a fishing line beyond the first end 24 of the fishing rig 10. Further, any of the rigs 10, 50 in the figures shown herein may include a hook 12, or the rigs 10, 50 may instead have only the second loop portion 38, 68 to which a hook 12 may be added at any time. To add a hook 12 to an assembled rig 10, 50, the second loop portion 38, 68 may include a device to which a hook may be threaded, clamped, or otherwise attached, or the second loop portion 38, 68 may be passed through the eye 16 of the hook 12 and secured by either passing the second loop portion 38, 68 over the shank 18 or by tying the second loop portion 38, 68 using various loop knots, modified Palomar knots, or other securing methods.

Referring now to FIGS. 3A and 3B, a third and fourth embodiment of an assembled fishing rig 10 are shown. Like the fishing rigs shown in FIGS. 1A and 1B, the third and fourth embodiments shown in FIGS. 3A and 3B may generally include a bait attachment means 14, a hook end 22, and a fishing line end 24. The fishing rigs described herein may not include a hook 12, but may instead include a hook connector, hook snap, or other hook connecting device (not shown), to which a hook 12 may be added at any time. For example, the fishing rigs 10 shown in FIGS. 3A and 3B do not include a hook. Also, the fishing rigs 10 as shown in FIGS. 3A and 3B may include a first line 13a that includes the fishing line end 24 and a first ring end 73, and second line 13b that includes the hook end 22 and a second ring end 74 (as opposed to a single line 13 as shown, for example, in FIGS. 1A and 1B).

The first and second lines 13a, 13b may be composed of any material suitable for use in the fishing industry, but wire (such as titanium or nickel-copper alloy) is shown in FIG. 3A and monofilament is shown in FIG. 1B. At the fishing line end 24 of the fishing rig 10, the first line 13a may include a first leader portion 26, a first loop portion 28, and a first tag end portion 30. The first loop portion 28 may be attached to a fishing line (not shown), and may be secured as described in FIGS. 1A and 1B. At the first ring end 73, the first line 13a may also include a second leader portion 36, a second loop portion 38, and a second tag end portion 40. At the first ring end 73, the first line 13a may include a second leader portion 36, a second loop portion 38, and a second tag end portion 40. The second loop portion 38 may be attached to an attachment means 14 such as a ring, hoop, washer, or any component 75 (referred to herein as "ring") that includes an aperture 76 sized to accommodate both the first and second lines 13a, 13b and the bait attachment line 47. The ring 75 used as the attachment means 14, as generally depicted in FIGS. 3A and 3B, may be composed of any suitable material, such as metal, glass, or plastic. The ring 75 may be a complete ring composed of a continuous piece of material (as opposed to, for example, a split ring or snap hook), as this may add strength to the fishing rig 10 and point of attachment to bait. Alternatively, a swivel device (such as barrel swivel or crane swivel) may also provide the required strength to the fishing rig 10 and point of attachment when used as a ring 75.

Like the attachment means 14 shown in FIGS. 1A and 1B, the ring 75 shown in FIGS. 3A and 3B may be substantially collinear with the rest of the fishing rig 10. Unlike the attachment means 14 shown in FIGS. 1A and 1B, the ring 75 may be an independent component to which the first and second lines are attached. Attachment may be in the same manner as the attachment between the line 13, 52 and hook 12 as described and shown in FIGS. 1A and 2B. That is, a line 13a, 13b composed of wire may be secured to the ring 75 using haywire twists, barrel locks, or other appropriate twists or knots 32. Likewise, a line 13a, 13b composed of monofilament may be secured to the ring 75 using one or more crimping sleeves 34 or similar clamping devices. The more twists or knots 32 or crimping sleeves 34 used, the stronger the attachment between the line 13a, 13b and ring 75 may be. Alternatively, the second loop portion 38 may be passed through the aperture 76 of the ring 75 and over the line 13a of the first ring end 73. Alternatively, the second loop portion 38 may be attached to the ring 75 via a swivel device, allowing the ring 75 to spin independently of the fishing rig 10. The size, strength, and material of the ring 75 may depend on the gauge of the line 13a, the size of the bait, and other factors.

At the second ring end 74 of the fishing rig 10, the second line 13b may include a third leader portion 78, a third loop portion 80, and a third tag end portion 82. The third loop portion 80 may be attached to the ring 75 as described for the second loop portion 38, and/or as shown and described in FIGS. 1A-2B. At the hook end 22, the second line 13b may include a fourth leader portion 84, a fourth loop portion 86, and a fourth tag end portion 88. A hook 12 may or may not be directly attached to the fourth loop portion 86 of the hook end 22. For example, a hook 12 may not be used on the fishing rig 10 if multiple hooks 12 are instead included in one or more extension rigs 50. Alternatively, a hook may be added or exchanged at a later time, such as when the user prefers to use different hooks in different fishing conditions.

All other features of the fishing rig 10, such as the length, composition, and gauge of the first and second lines 13a, 13b, and size of crimping sleeves are as described and shown in FIGS. 1A and 1B. Additionally, one or more extension rigs 50 as described and shown in FIGS. 2A and 2B may be added to the hook end 22 of the fishing rig 10, also as described and shown in FIGS. 2A and 2B.

Figure 4:
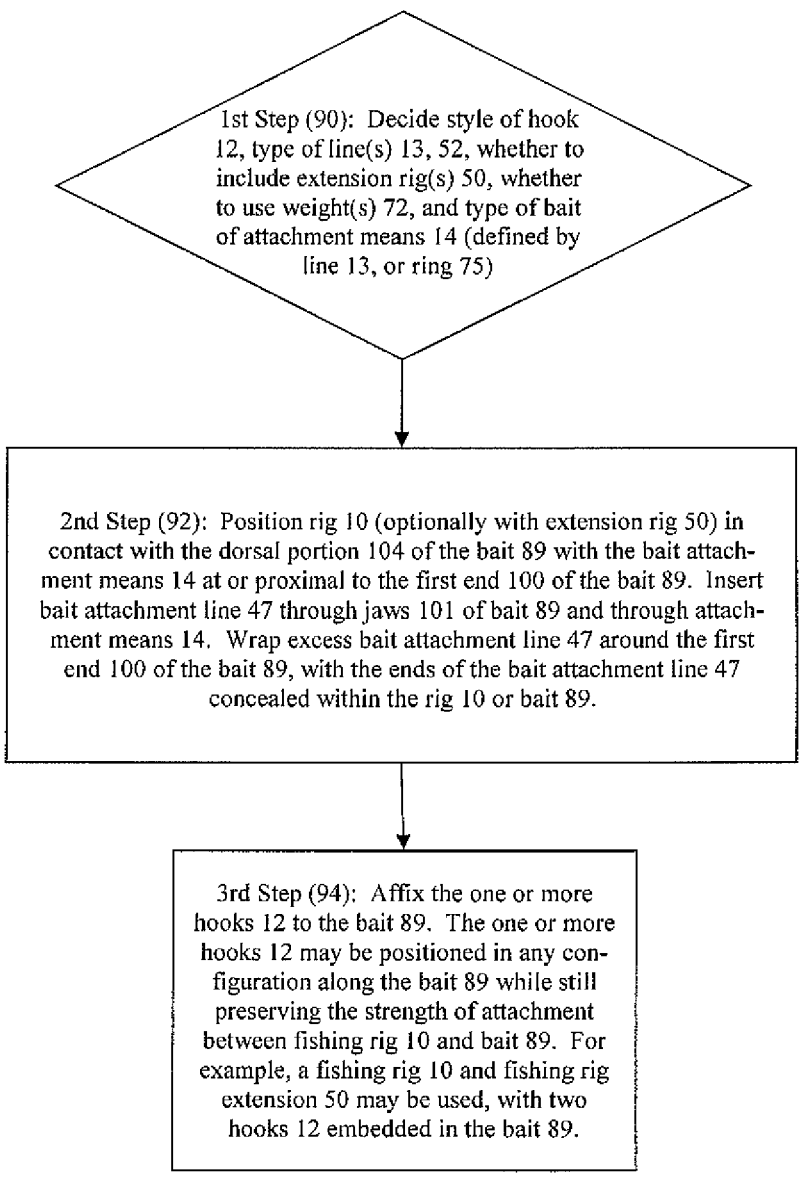
FIG. 4 shows a flow chart showing a method for attaching a fishing rig to bait.

Referring now to FIG. 4, a flow chart for a first and second method of affixing a rig (as described in FIGS. 1A, 1B, 2A, and 2B) to bait 89 is shown. The method generally includes three broad steps: a first step 90 in which the user may decide the materials and bait 89 to use, a second step 92 in which the user may affix the line 13 of a fishing rig 10 to bait 89, and a third step 94 in which the user may affix the one or more hooks 12 to bait 89.

In the first step 90 of the method, the user may select the preferred materials and bait 89 for the fishing and/or extension rigs 10, 50. For example, the user may select whether to use a wire or monofilament line 13, 52, what kind of attachment means 14 to use (such as a diamond 44, box 46, or ring 75) whether to include one or more additional hooks 12 by attaching one or more extension rigs 50, whether to include one or more weights 72, the size of the one or more hooks 12, and the gauge/diameter of line 13, 52. If the user prefers to include one or more extension rigs 50, the user may attach the extension rigs 50 to the fishing rig 10 in this step. Additionally, the user may select the preferred bait 89. For example, depending on the target species, ballyhoo, eel, or squid may be used as bait 89. For simplicity of explanation, FIG. 3 includes ballyhoo as bait 89. The bait 89 may include a first end 100 (proximal to the head area of a live or dead fish bait, which, depending on the bait used, may include a top jaw 101a, a bottom jaw 101b, and a bill 91), a second end 102 (proximal to the tail of a live or dead fish bait), a dorsal portion 104, a ventral portion 106, a first side 108, and a second side 110.

In the second step 92 of the method, the line 13, 13a of the fishing rig 10 may be affixed to the bait 89. For this step 92, a bait attachment line 47 may be used. The fishing rig 10 may be laid on or otherwise placed in contact with the dorsal portion 104 of the bait 89, with the attachment means 14 at or proximal to the first end 100 of the bait 89 and in contact with the dorsal portion 104 of the bait 89. That is, the bait attachment means 14 may be positioned on the dorsal portion 104 of the top jaw 101a, if bait having jaws 101 is used. The bait attachment line 47 may be inserted through the jaws 101 (or head area, such as if using squid) of the bait 89, either through the bottom jaw 101a then top jaw 101b, or through the top jaw 101b then bottom jaw 101a, as long as the bait attachment line 47 passes through the attachment means 14. Excess bait attachment line 47 may be wound around the bait 89, at least a portion of the fishing rig 10, and a portion of fishing line at the first end 100 of the bait 89, tightly enough that the bait attachment line 47 is substantially flush with the bait 89 with no protrusions that could snag debris in the water. Additionally, the bait attachment line 47 wound around both jaws 101 of the bait 89 may ensure that the mouth of the bait 89 remains closed and does not add drag to the rig 10. If a bait 89 such as ballyhoo is used (as shown in FIGS. 5A and 5B), the bait attachment line 47 may be wrapped along at least a portion of the bill 91 of the ballyhoo, but may be wrapped around the substantially the entire bill 91 out to the bill tip. The greater the length of bill 91 wrapped by the bait attachment line 47, the stronger the connection between the fishing rig 10 and bait 89 may be. Any portion of bill 91 not wrapped may be broken off and discarded.

In the third step 94 of the method, the one or more hooks 12 may be affixed to the bait 89. Because the attachment means 14 may provide the point of attachment between the fishing rig 10 and bait 89, the one or more hooks 12 may be positioned in any configuration along the bait 89 while still preserving the strength of attachment between fishing rig 10 and bait 89. For example, a fishing rig 10 and fishing rig extension 50 may be used, with two hooks 12 embedded in the bait 89 (the hooks 12 may be passed through the first side 108 and out the second side 110 of the bait 89, with the one or more barbs 20 in contact with (tucked back against) the second side 110 of the bait 89). Because the hooks and one or more barbs 20 do not protrude from the bait 89 in this configuration, it may not snag debris while being dragged through the water (thereby making the fishing rig 10 a "weedless" rig).

Referring now to FIGS. 5A and 5B, the method of FIG. 4 is shown. As described above, the fishing rig 10 may be placed in contact with the dorsal portion 104 of the bait 89, with the attachment means 14 at or proximal to the first end 100 of the bait 89. The bait attachment line 47 may be inserted through the jaws 101 of the bait 89 (or first end, if using a bait without jaws), with the excess bait attachment line 47 then wrapped around the first end 100 of the bait 89. As in the exemplary configurations of FIGS. 5A and 5B, the bait attachment line 47 may be wrapped along a substantial length of the bill 91 of the bait (if, for example, ballyhoo is used). After an appropriate amount of the first end 100 of the bait 89 (which may include the bill 91, as in FIGS. 5A and 5B) is wrapped, the ends of the bait attachment line 47 may be tied, tucked in, or otherwise disposed (such as by continuing to wrap the bait attachment line 47 until the ends are in contact with the bait 89 or wrapped bait attachment line 47) about the bait 89 bill 91 or within the fishing rig 10 or wrapped bait attachment line 47 so that the ends do not protrude from the fishing rig 10 or bait 89. As described in the third step 94 of the method of FIG. 4, the hooks may be positioned at any location along the bait 89. The example described for FIG. 4, in which the hooks are passed through the body of the bait 89 with the one or more barbs 20 tucked back against the second side 110 of the bait 89, is shown in FIGS. 5A (top view) and 5B (side view).

It should be understood that any of the above components, materials, and methods could used in any combination. For example, a fishing rig 10 may include a monofilament line 13 and may be attached to an extension rig 50 including a wire line 52. Further, a fishing rig 10 including a ring 75 as an attachment means 14 may include a first line 13a composed of wire and a second line 13b composed of monofilament.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for affixing a pinless fishing apparatus to a bait, the method comprising:
   providing a fishing apparatus including:
      a line;
      a bait attachment device being defined by the line and having one of a box-shaped aperture and a diamond-shaped aperture and being substantially collinear with the fishing apparatus;
      a length of malleable wire having a first end and second end and sized to be passed through the bait attachment device and circumscribe the bait at least once; and
   providing the bait, the bait having a first end, a second end, a dorsal portion, a ventral portion, a first side, and a second side;

positioning the fishing apparatus on the dorsal portion of the bait, the bait attachment device being proximal to the first end of the bait and in contact with the dorsal portion of the bait;

passing the length of malleable wire through the ventral portion of the first end of the bait, out the dorsal portion of the first end of the bait, and through the aperture of the bait attachment device;

circumscribing at least once with the malleable wire the first end of the bait and at least a portion of a line of the fishing apparatus;

positioning the first end and second end of the length of malleable wire such that the ends do not protrude from the bait or fishing apparatus; and passing the at least one hook through the bait such that:
the hook passes through the bait from the first side to the second side, the hook being positioned such that the at least one barb of the at least one hook is in contact with the second side of the bait; or
the hook passes through the bait from the second side to the first side, the hook being positioned such that the at least one barb of the at least one hook is in contact with the first side of the bait.

2. A pinless fishing apparatus comprising:
a rig line;
a bait attachment line having a diameter; and
a bait attachment element defined by the rig line and having an aperture sized to accommodate the diameter of the bait attachment line, the bait attachment element being one of square, rectangular, and diamond shaped;
the rig line and the bait attachment element being substantially collinear and the bait attachment line being connectable to the bait attachment element.

3. The apparatus of claim 2, wherein the bait attachment line is between approximately 3 and approximately 15 inches in length.

4. The apparatus of claim 2, wherein the bait attachment line is composed of copper.

5. The apparatus of claim 2, wherein the rig line is composed of metal wire.

6. The apparatus of claim 2, wherein the rig line is composed of monofilament or braided line.

7. The apparatus of claim 2, wherein the fishing apparatus includes:
a first end;
a second end, the second end defining a main loop; and
a hook attached to the main loop.

8. The apparatus of claim 7, wherein the fishing apparatus further includes:
an extension rig defined by an extension rig line, the extension rig having a first extension rig loop and a second extension rig loop; and
an extension rig hook,
the first extension rig loop being attached to the pinless fishing apparatus main loop and the second extension rig loop being attached to the extension rig hook.

9. A pinless fishing apparatus comprising:
a rig line;
a bait attachment line having a diameter;
a bait attachment element defined by the rig line, the bait attachment element defining an aperture sized to accommodate the diameter of the bait attachment line, the aperture being one of diamond shaped and box shaped,
the rig line and the bait attachment element being substantially collinear, and the pinless fishing apparatus having a first end and a second end, the second end of the pinless fishing apparatus defining a main loop and having a hook attached thereto.

10. The apparatus of claim 9, wherein the aperture is approximately 0.10 inch to approximately 0.50 inch in diameter.

11. The device of claim 9, wherein the bait attachment line is composed of metal wire, monofilament, or braided line.

12. The apparatus of claim 9, wherein the fishing apparatus further includes:
an extension rig defined by an extension rig line, the extension rig having a first extension rig loop and a second extension rig loop; and
an extension rig hook,
the first extension rig loop being attached to the pinless fishing apparatus main loop and the second extension rig loop being attached to the extension rig hook.

* * * * *